United States Patent [19]

Gusmano

[11] Patent Number: 5,532,845
[45] Date of Patent: Jul. 2, 1996

[54] HIGH SPEED HIGH RESOLUTION PLATEN SCANNING SYSTEM USING A PLURALITY OF SCANNING UNITS

[75] Inventor: Donald J. Gusmano, Henrietta, N.Y.

[73] Assignee: Xerox Corporation, Stamford, Conn.

[21] Appl. No.: 342,540

[22] Filed: Nov. 21, 1994

[51] Int. Cl.[6] .............................. H04N 1/00; H04N 1/04; H04N 1/387
[52] U.S. Cl. .................. 358/474; 358/408; 358/450; 358/496; 358/497; 358/498
[58] Field of Search ..................... 358/408, 450, 358/448, 452, 471, 474, 486, 482, 483, 496, 497, 498; 348/230, 321, 218

[56] References Cited

U.S. PATENT DOCUMENTS

| | | | |
|---|---|---|---|
| 3,813,483 | 5/1974 | Kurosawa et al. | 178/6 |
| 4,378,571 | 3/1983 | Handy | 358/213 |
| 4,631,598 | 12/1986 | Burkhardt et al. | 358/280 |
| 4,641,199 | 2/1987 | Miyagi | 358/285 |
| 4,712,134 | 12/1987 | Murakami | 358/213.13 |
| 4,774,592 | 9/1988 | Suzuki et al. | 358/285 |
| 4,972,273 | 11/1990 | Burkhardt et al. | 358/443 |
| 5,144,448 | 9/1992 | Hornbaker, III et al. | 358/213.13 |

FOREIGN PATENT DOCUMENTS 0177312  9/1986  United Kingdom ........... H04N 1/387

*Primary Examiner*—Edward L. Coles, Sr.
*Assistant Examiner*—Allan A. Esposo
*Attorney, Agent, or Firm*—Michael J. Nickerson

[57] ABSTRACT

A digital scanner, which is capable of scanning a document having L scanlines, includes M optical scanning systems wherein M is equal to or greater than 2. Each optical scanning system scans only L/M scanlines of the document such that an area of the document scanned by a single optical scanning system does not overlap an area of the document scanned by another single optical scanning system. The digital scanner also includes a plurality of parallel image processing circuits, each connected to one of the M optical scanning systems, to produce a plurality of sets of digital image data. Each set of image data corresponds to an image scanned by a single optical scanning system. A stitching circuit is connected to the plurality of parallel image processing circuits to stitch together the plurality of sets of digital image data to produce a complete image. The image data generated by the stitching circuit can be used to display or store the scanned image Moreover, a printing system can be connected to the stitching circuit of the digital scanner to create a digital copier.

13 Claims, 4 Drawing Sheets

HIGH SPEED HIGH RESOLUTION PLATEN SCANNING SYSTEM USING A PLURALITY OF SCANNING UNITS

FIELD OF THE PRESENT INVENTION

The present invention is directed to a high speed, high resolution platen scanning system. More specifically, the present invention is directed to a platen scanning system utilizing more than one full-width array scanner on a carriage assembly to scan a document.

BACKGROUND OF THE PRESENT INVENTION

Typically, an entire document is scanned by a digital scanner using a single scanning system, either a single full-width array carriage or a half-rate/full-rate carriage scanning mechanism. One example of a digital scanner is a platen scanning system where the document is stationary and the scanning system moves. In the platen scanning system, a single mobile carriage is utilized to scan the entire document. The carriage assembly, conventionality, includes a full-width CCD array system and a light source. The full-width CCD array receives light reflected from the document and converts the light into electrical signals representing the intensity of the received light. The electrical signals are then passed on to an electronic subsystem which performs the necessary image processing operation so as to prepare the image data either for display on a display devices such as a CRT, for storage by a storage device such as a CD-ROM, or for recording or printing on a medium such as a document.

Another example of a digital scanner is a constant velocity transport (CVT) scanning system where the document moves and the scanning system is stationary. In the CVT scanning system, a single stationary scanning system is utilized to scan the entire document wherein the document is moved past the scanning system. This scanning system, conventionality, includes a full-width CCD array system and a light source. As in the platen scanning system, the full-width CCD array receives light reflected from the document and converts the light into electrical signals representing the intensity of the received light. The electrical signals are then passed on to an electronic subsystem which performs the necessary image processing operation so as to prepare the image data either for display on a display devices such as a CRT, for storage by a storage device such as a CD-ROM, or for recording or printing on a medium such as a document.

A disadvantage with these scanning systems has been the inability of these systems to provide a high speed process which is also capable of providing a high resolution signal. Both high speed and high resolution is required in many applications to make such a system feasible, especially where large volumes of documentary material must be scanned at a high rate of speed with sufficient detail for reproduction of the documentary material with a high degree of resolution.

The conventional platen scanning system, described above, is capable of scanning a document at low or intermediate speeds with relatively high resolution, but cannot adequately scan a document at very high speeds with this high resolution. Moreover, a conventional platen scanning system is limited in speed because the physics in controlling the scanning optics become too difficult at very high speeds.

For example, a half-rate/full-rate system can scan up to around 55 copies per minute, depending on the inter document gap time and sampling resolution as illustrated in FIG. 1. FIG. 1 shows a graphical representation of the relationship between the scans per minute and the sensor pixel rate for a half-rate/full-rate scanning system. The graph shows that the top scanning rate for a half-rate/full-rate system is approximately 55 scans per minute at a resolution of 400 dots per inch by 400 lines per inch. However, if one increases the resolution to 400 dots per inch by 600 lines per inch, the top scanning rate for a commercial half-rate/full-rate scanning system is approximately 42 scans per minute. Thus, the conventional half-rate/full-rate scanning system cannot realize both high speed and high resolution.

On the other hand, a full-width array scanning system has parallel channels that allow the sensors on the full-width CCD array system to operate at a higher data rate than the typical CCD sensor associated with a half-rate/full-rate system. Such a full-width array scanning system are capable of producing high resolution scans of an image; however, the speed of the full-width array scanning system is limited by the speed it can travel or the document can be passed thereby wherein the speed is limited by the actual physics in controlling the scanning mechanism. Presently, the limit of the speed of a scanning mechanism is around 20 to 25 inches per second. Thus, the top rate for a full-width array scanning system, as illustrated in FIG. 2, is between 75 and 90 copies per minute. Examples of such systems are disclosed in U.S. Pat. No. 4,631,598 and U.S. Pat. No. 4,972,273. The entire contents of both U.S. Pat. No. 4,631,598 and U.S. Pat. No. 4,972,273 are hereby incorporated by reference.

Although a full-width CCD array system can achieve 90 scans per minute with a relatively high resolution, this speed is still slower than conventional high speed digital printers which can produce from 135 to 180 prints per minute. In other words, to develop a high speed, high resolution digital copier, the speed of the digital scanner should be approximately equal to the printing speed of the system reproducing the copies, otherwise the digital copier cannot operate with full efficiency. Therefore, it is desirable to develop a high speed high resolution, high resolution scanner which is capable of scanning documents at a speed equivalent to that which a high speed high resolution printing system with relatively high resolution.

SUMMARY OF THE PRESENT INVENTION

One aspect of the present invention is a digital scanner for scanning a document having L scanlines of image data. The digital scanner includes M optical scanning systems wherein M is equal to or greater than 2. Each optical scanning system scans only L/M scanlines of the document such that an area of the document scanned by a single optical scanning system does not overlap an area of the document scanned by another single optical scanning system.

Another aspect of the present invention is a method for digitally scanning a document having L scanlines of image data. The method scans scanlines 1 to L/2 of the document with a first optical system and scans, concurrently with the scanning by the first optical system, scanlines L/2+1 to L of the document with a second optical system.

A third aspect of the present invention is a digital scanner. The digital scanner includes a platen and a scanner carriage assembly. The scanner carriage assembly includes a first optical system having a first light source, a first lens system, and a first full-width array sensor and a second optical having a second light source, a second lens system, and a second full width array sensor. The first and second full-width array sensor are spaced L/2–N scanlines from each other wherein L is a number of document scanlines in a slow scan direction and N is a number of overlapped scanlines.

A fourth aspect of the present invention is a digital copier for copying a document having L scanlines of image data. The digital copier includes M optical scanning systems wherein M is equal to or greater than 2. Each optical scanning system scans only L/M scanlines of the document such that an area of the document scanned by a single optical scanning system does not overlap an area of the document scanned by another single optical scanning system. The digital copier also includes a plurality of image processing means, each operatively connected to one of the M optical scanning systems, for producing a plurality of sets of digital image data, each set of image data corresponding to an image scanned by a single optical scanning system. A stitching means is operatively connected to the plurality of image processing means to stitch together the plurality of sets of digital image data to produce a complete image. Lastly, a printing system is operatively connected to the stitching means.

Further objects and advantages of the present invention will become apparent from the following descriptions from the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
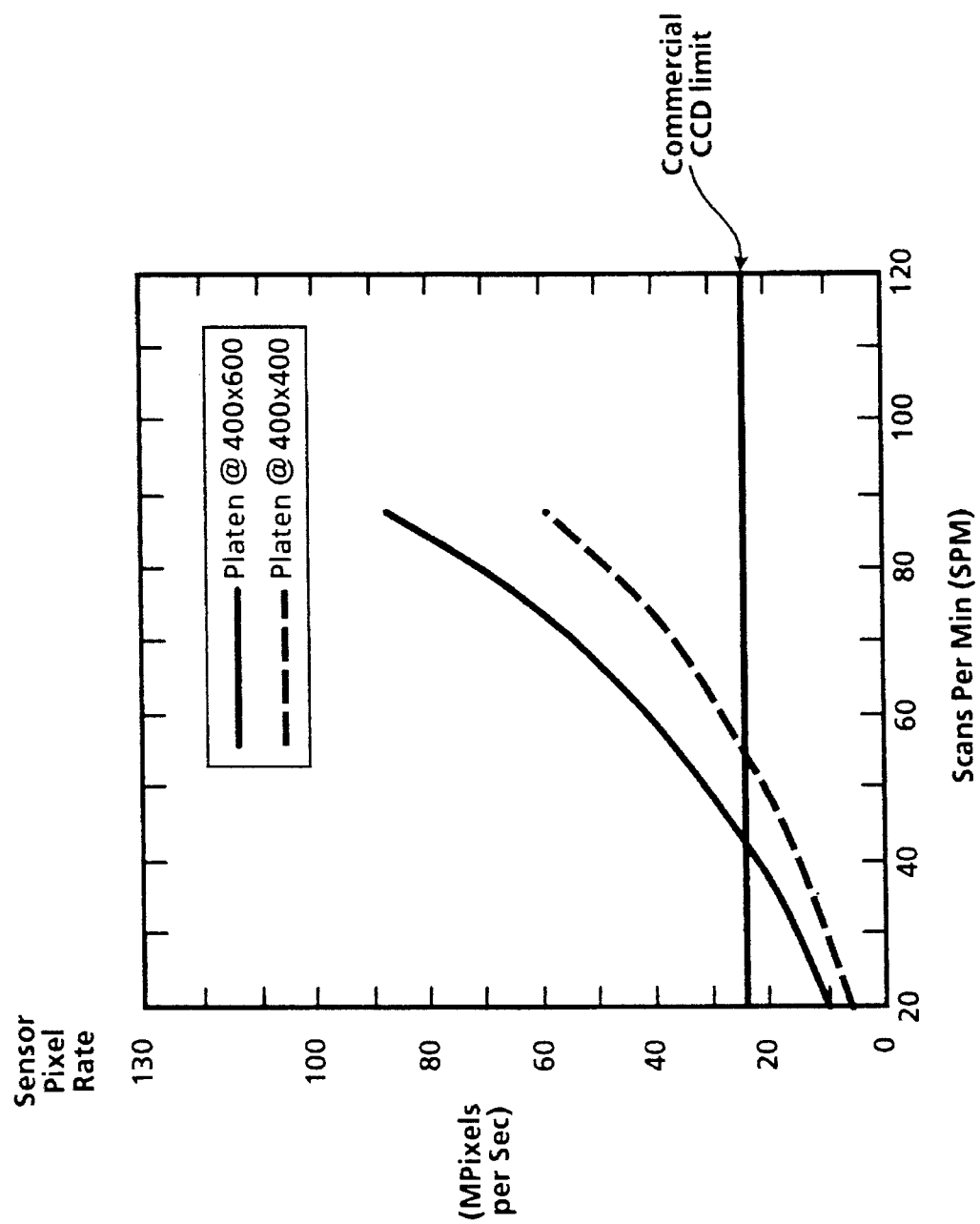
FIG. 1 shows a graphical representation illustrating the scanning rate of a half-rate/full-rate scanning system.
Figure 2:
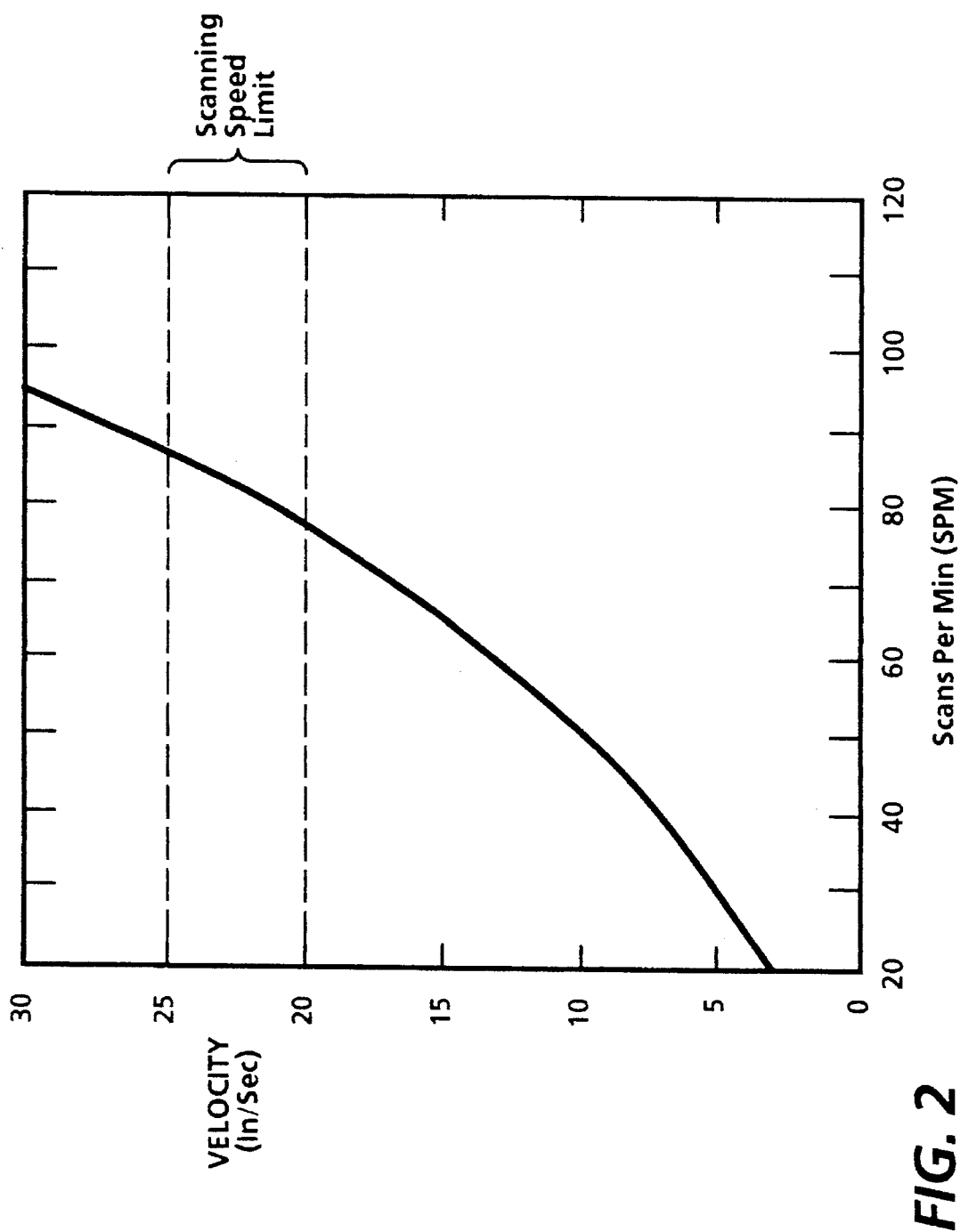
FIG. 2 shows a graphical illustration illustrating the scanning rate of a conventional full-width array scanning system.

The following will be a detailed description of the drawings illustrated in the present invention. In the description, as well as in the drawings, like references represent like devices, circuits, or circuits performing equivalent functions.

Figure 3:
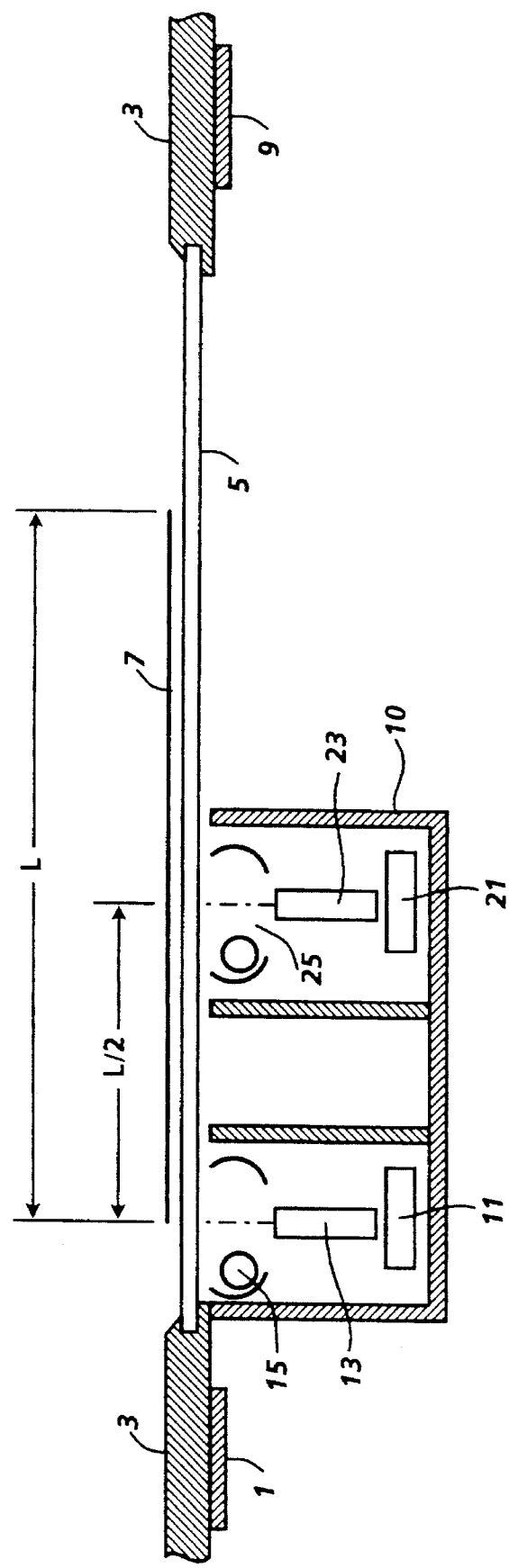
FIG. 3 illustrates a scanning system of the preferred embodiment of the present invention.

FIG. 3 illustrates a high speed, high resolution scanning system of the preferred embodiment of the present invention. In FIG. 3, a platen scanning system is utilized to scan a document 7. The platen scanning system includes a platen support 3 which supports a platen glass 5 upon which the document 7 is placed. The document 7 is scanned by a single carriage assembly 10 which includes two full-width CCD array optical scanning systems. The first full-width CCD array optical scanning system includes a light source 15, a lens 13, and a full-width CCD array 11. The second full-width CCD array optical scanning system includes a light source 25, a lens 23 and a second full-width CCD array 21. These two full-width array CCD optical scanning systems are assembled on the single carriage assembly 10 so as to enable proper scanning of the document resting on the platen glass 5.

As illustrated in FIG. 3, the length of the document in the slow scan direction (the slow scan direction being the direction that is physically traveled by the optics scanning system) is L scanlines. In this illustration, each full-width array sensor 11 and 21 will scan half of the document so as to electronically produce image data represented in the document wherein the image data will be electronically processed and stitched together in the circuit illustrated in FIG. 4.

As illustrated in FIG. 3, the full-width CCD array scanning systems are mounted on a single carriage assembly 10 which spaces the two full-width CCD array scanning systems half a document apart. In other words, as illustrated in FIG. 3, the two full-width CCD array scanning systems are spaced L/2 scanlines apart. It is noted that the two full-width CCD array scanning systems can also be spaced less than half a document apart (L/2–N) so that the scanning by this double full-width CCD array scanning system will produce a small overlap of 2*N scanlines of image data (scanlines L/2–N to L/2+N). During a scan, the scan carriage assembly 10 need only travel half the distance of the document when there is no overlap. Thus, the carriage assembly 10 with its double full-width CCD array system needs only half the time as a single full-width CCD array system to scan a full document when there is no overlap.

By having two full-width CCD array systems working in tandem, the image data produced by these scanning systems will be generated in parallel. Since the image data produced from both full-width CCD array systems will be generated in parallel, the image data needs to be processed in parallel over two separate channels so that the processing of the image data does not significantly impact the speed of digital scanner or digital copier. Such a parallel process is illustrated in FIG. 4.

Figure 4:
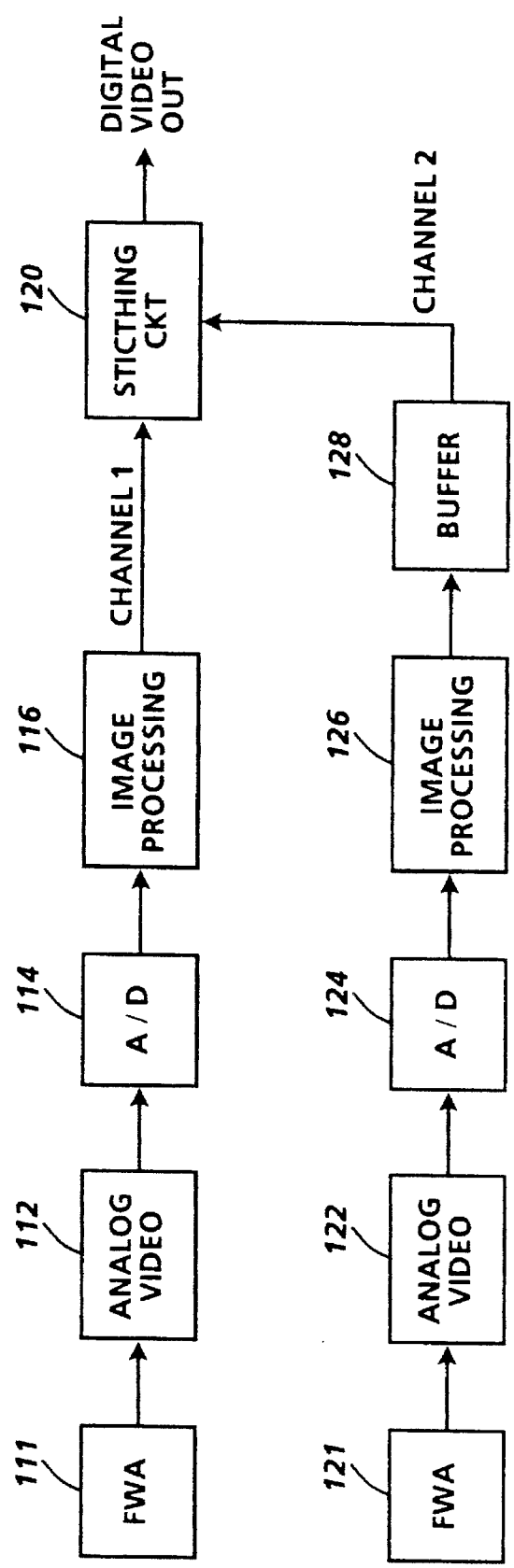
FIG. 4 shows a block diagram illustrating a circuit used to produce image data from the scanning system of the present invention.

In FIG. 4, a full-width CCD array 111 associated with the first full-width array optical scanning system produces image data. This image data is fed to a first channel. The image data on the first channel is then fed into an analog video circuit 112 which provides offset or gain corrections to the image data so as to produce an analog signal representing the intensity of the light sensed by the pixels of the full-width CCD array 111. The analog image data is then fed into an analog to digital converter 114 which converts the image data into a digital format. Next, the digital image data on the first channel is fed into an image processing module 116 which performs various image processing operations upon the digital data and prepares the digital image data for rendering on a recording medium, storing in a memory, or displaying on a display device.

As also illustrated in FIG. 4, the full-width CCD array 121 of the second optical scanning system produces image data in the same manner as discussed above with respect to the full-width CCD array 111 associated with the first channel. However, the image data produced by the full-width CCD array sensor 121 outputs image data onto a second channel. The image data on the second channel is then fed into an analog video circuit 122 which provides offset or gain corrections to the image data so as to produce an analog signal representing the intensity of the light sensed by the pixels of the full-width CCD array 121. The analog image data is then fed into an analog to digital converter 124 which converts the image data into a digital format. Next, the digital image data on the second channel is fed into an image processing module 126 which performs various image processing operations upon the digital data and prepares the digital image data for rendering on a recording medium, storing in a memory, or displaying on a display device The image data which has been processed by the image processing circuit 126 is fed into a buffer 128 which temporarily stores the image data until it is needed by a stitching circuit 120.

The stitching circuit 120 is a conventional circuit which receives both the image data from the first channel and the image data from the second channel. Examples of such circuits is disclosed in U.S. Pat. No. 4,631,598 and U.S. Pat. No. 4,972,273 which have been previously, in their entirety, incorporated by reference.

The stitching circuit 120 is responsible for putting the two channels of image data together to reproduce the scanned image. To achieve this result, the stitching circuit 120 allows the image data from the first channel to pass through as digital video data when the image data on the first channel 1 is associated with scanlines 1 to L/2. The stitching circuit 120 tracks the scanline number with a counter that is incremented in response to a scanline sync signal, and thus, as long as the value of the counter is less than or equal to L/2, the stitching circuit 120 will allow the data from the first channel to pass through as image data. However, if the value in the counter exceeds L/2, the stitching circuit 120 will allow the data from the second channel to pass through as image data.

On the other hand, when the full-width CCD array scanning systems produce overlapping image data, the stitching circuit 120 operates as follows. The stitching circuit 120 allows the image data from the first channel to pass through as digital video data when the image data on the first channel 1 is associated with scanlines 1 to L/2–N. However, when the image data on the first channel is associated with scanline L/2–N, the stitching circuit retrieves the image data on the second channel associated with scanline L/2–N. The stitching circuit then properly processes the overlapped scanlines utilizing conventional stitching methods. The stitching circuits 120 continues this overlap stitching process on the image data from the first and second channels for each scanline from L/2–N to L/2+N. When the counter exceeds a value equal to L/2+N, the stitching circuit 120 retrieves the image data on the second channel and allows this image data to pass therethrough as digital video data. It is noted that upon reaching scanline L/2+N, the first optical scanning system will not have produced any further data since the first optical scanning system will have not traveled any further than L/2+N scanlines.

The value L can be established by the user inputting the size of the document being scanned through a conventional user interface or the information can be derived from a prescan of the document which is used to measure the size of the document to be scanned. The value N is predetermined by the physical distance between the full-width CCD array scanning systems. This value can be stored in the digital scanner or digital copier.

Although the present invention has been described above with respect a double full-width CCD array scanning system, the present invention also contemplates an optical array scanning system having a multiple number of full-width CCD array systems attached to a single carriage assembly so that each full-width array optical scanning system need only scan a portion of the full document.

The present invention has been described in detail above; however, various modifications can be implemented without departing from the spirit of the present invention. For example, the preferred embodiment of the present invention has been described with respect to a single carriage system; however, the present invention can be readily implemented with a multiple number of carriage assemblies, each having a single scanning system associated therewith, which act in tandem but may have independent driving systems.

In recapitulation, the present invention provides a high speed, high resolution digital scanning system which enables a digital scanning system to effectively scan at high speeds with a high resolution.

While the present invention has been described with reference to various embodiments disclosed herein before, it is not to be confined to the detail set forth above, but is intended to cover such modifications or changes as made within the scope of the attached claims.

What is claimed is:

1. A digital copier for copying a document having L scanlines of image data, comprising:

M optical scanning systems, M being equal to or greater than 2, each optical scanning system scanning only L/M scanlines of the document, L being a number of document scanlines in a slow scan direction, such that an area of the document scanned by a single optical scanning system does not overlap an area of the document scanned by another single optical scanning system;

a plurality of image processing means, each operatively connected to one of said M optical scanning systems, for producing a plurality of sets of digital image data, each set of image data corresponding to an image scanned by a single optical scanning system;

stitching means, operatively connected to said plurality of image processing means, for stitching together the plurality of sets of digital image data to produce a complete image; and a printing system operatively connected to said stitching means.

2. The digital copier as claimed in claim 1, wherein M is equal to 2.

3. The digital copier as claimed in claim 1, wherein M is equal to 3.

4. The digital copier as claimed in claim 1, wherein M is equal to 4.

5. A digital scanner, comprising:

a platen; and a scanner carriage assembly;

said scanner carriage assembly including,
a first optical system having a first light source, a first lens system, and a first full-width array sensor, and
a second optical system having a second light source, a second lens system, and a second full width array sensor;

said first and second full-width array sensors being spaced L/2–N scanlines from each other, L being a number of document scanlines in a slow scan direction and N being a number of overlapped scanlines.

6. The digital scanner as claimed in claim 5, further comprising:

first image processing means, operatively connected to said first optical system, for producing first digital image data corresponding to an image scanned by said first optical system;

second image processing means, operatively connected to said second optical system, for producing second digital image data corresponding to an image scanned by said second optical system; and stitching means, operatively connected to said first and second image processing means, for stitching together the first and second digital image data to produce a complete image.

7. A digital scanner for scanning a document having L scanlines of image data, comprising:

M optical scanning systems, M being equal to or greater than 2, each optical scanning system concurrently scanning only L/M scanlines of the document, L being a number of document scanlines in a slow scan direction, being such that an area of the document scanned by a single optical scanning system does not overlap an area of the document scanned by another single optical scanning system.

8. The digital scanner as claimed in claim 7, further comprising:

a plurality of image processing means, each operatively connected to one of said M optical scanning systems, for producing a plurality of sets of digital image data, each set of image data corresponding to an image scanned by a single optical scanning system; and stitching means, operatively connected to said plurality of image processing means, for stitching together the plurality of sets of digital image data to produce a complete image.

9. The digital scanner as claimed in claim 7, wherein M is equal to 2.

10. The digital scanner as claimed in claim 7, wherein M is equal to 3.

11. The digital scanner as claimed in claim 7, wherein M is equal to 4.

12. A method for digitally scanning a document having L scanlines of image data, L being a number of document scanlines in a slow scan direction, comprising the steps of:

(a) scanning scanlines 1 to L/2 of the document with a first optical system;

(b) scanning, concurrently with the execution of said step (a), scanlines L/2+1 to L of the document with a second optical system.

13. The method as claimed in claim 12, further comprising the steps of:

(c) producing a first and second set of digital image data, the first set of image data corresponding to the first optical system, the second set of image data corresponding to the second optical system; and (d) stitching together the first and second sets of digital image data to produce a complete image.

* * * * *